Jan. 12, 1943.　　　W. D. PARKER　　　2,307,946
CONTROLLER FOR INDUSTRIAL TRUCKS
Filed Sept. 11, 1940　　　3 Sheets-Sheet 1

INVENTOR.
WAVEARD D. PARKER
BY
Fay, Golrick, Williams and Fay
ATTORNEYS.

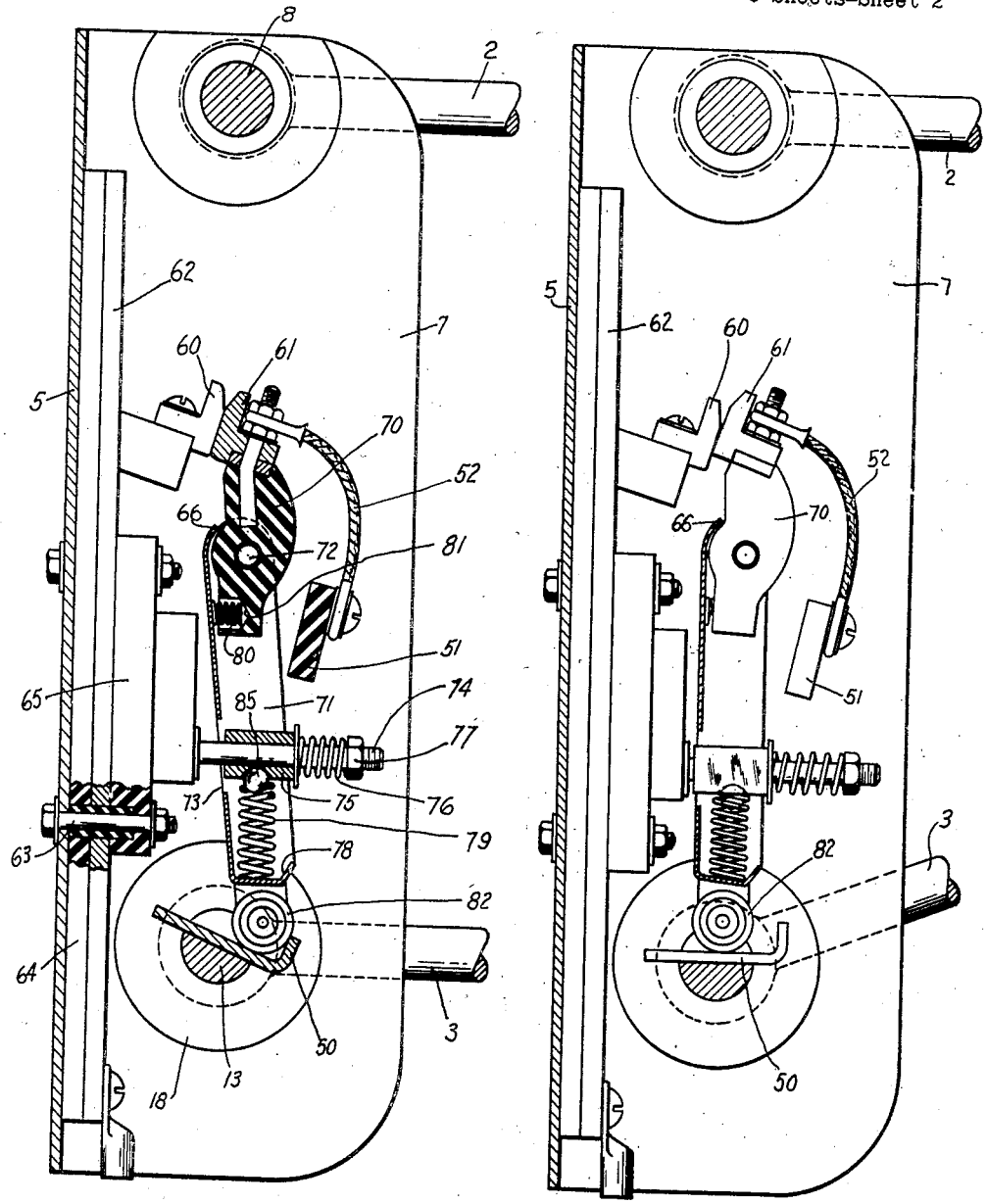

Patented Jan. 12, 1943

2,307,946

UNITED STATES PATENT OFFICE 2,307,946

CONTROLLER FOR INDUSTRIAL TRUCKS

Waveard D. Parker, Bay Village, Ohio, assignor to Elwell-Parker Electric Company Application September 11, 1940, Serial No. 356,327

4 Claims. (Cl. 200—6)

This invention relates to industrial trucks and particularly to the electrical controller mechanism for actuating the various functions of the truck.

As many industrial trucks are now operated from an electrical source of power, the controller mechanism for energizing the driving motor of the truck is of considerable importance. In most instances the electrical energy is supplied from storage batteries and the voltage used is relatively low. However, the current on the other hand is relatively high and may exceed 300 to 500 amperes, when the truck is operating under adverse conditions, such as climbing a steep grade or after a quick acceleration has been required.

Considerable difficulty has heretofore been experienced in providing a controller which is capable of breaking the electrical circuit to the power drive when the truck is operating under the adverse condition as hereinbefore mentioned. In most of the controllers now in use a wiping action is provided between the contactors of the controller when closing the circuit at low amperages when the truck is in a relatively stationary position. A solenoid coil, or a spring release mechanism may thereafter be employed to break the contactors and thereby disconnect the power drive from the source of electrical energy, when the truck is in operation. While this type of controller may work satisfactorily for closing the circuit it is sometimes found that due to overheating of the contactor surfaces under adverse operating conditions, the contactors may become fused together and prevent an immediate break of the power circuit. Under such conditions, of course, damage to the truck by collision or overheating may easily occur.

In view of the present load requirements for industrial trucks it is an object of my present invention to provide a controller for the electrical driving circuit of the truck in which the source of power may be positively disconnected under any adverse load conditions.

It is a further object of my invention to provide a novel, quick-acting make-and-break device for an electrical controller.

A further object is to provide a positive mechanical separation of the contactor surfaces before the circuit is broken.

Further objects of my invention will become more apparent from the following description given in connection with the accompanying drawings in which:

Fig. 3 is a sectional view taken along the line 3—3 in Fig. 2 illustrating the closed position of one of the contactor units;

Fig. 4 is a similar view illustrating the intermediate position of one of the contactor units;

Figure 1:
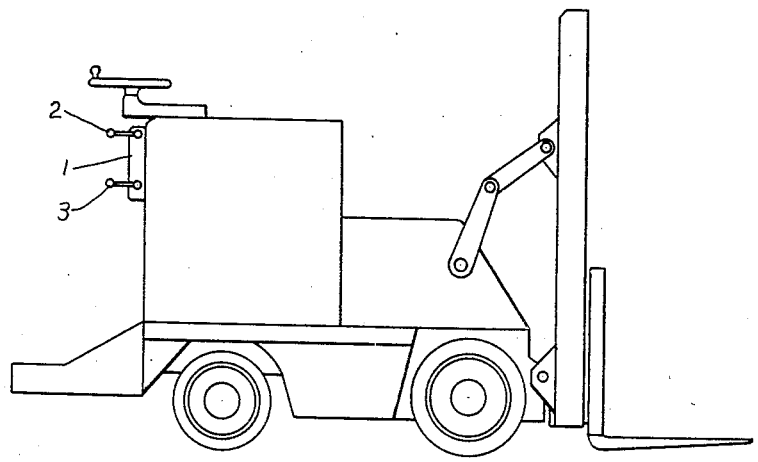
Fig. 1 is a side elevation of an industrial truck illustrating the use of my controller.

Referring now to Fig. 1, I have illustrated as attached to an industrial truck a controller housing 1 containing the necessary mechanism for operating the various movements of the truck. The upper control handle 2 engages the necessary contactors for the forward or reverse movement of the truck and the lower control handle 3 actuates a series of resistances to control the relative speed of the power drive.

Figure 2:
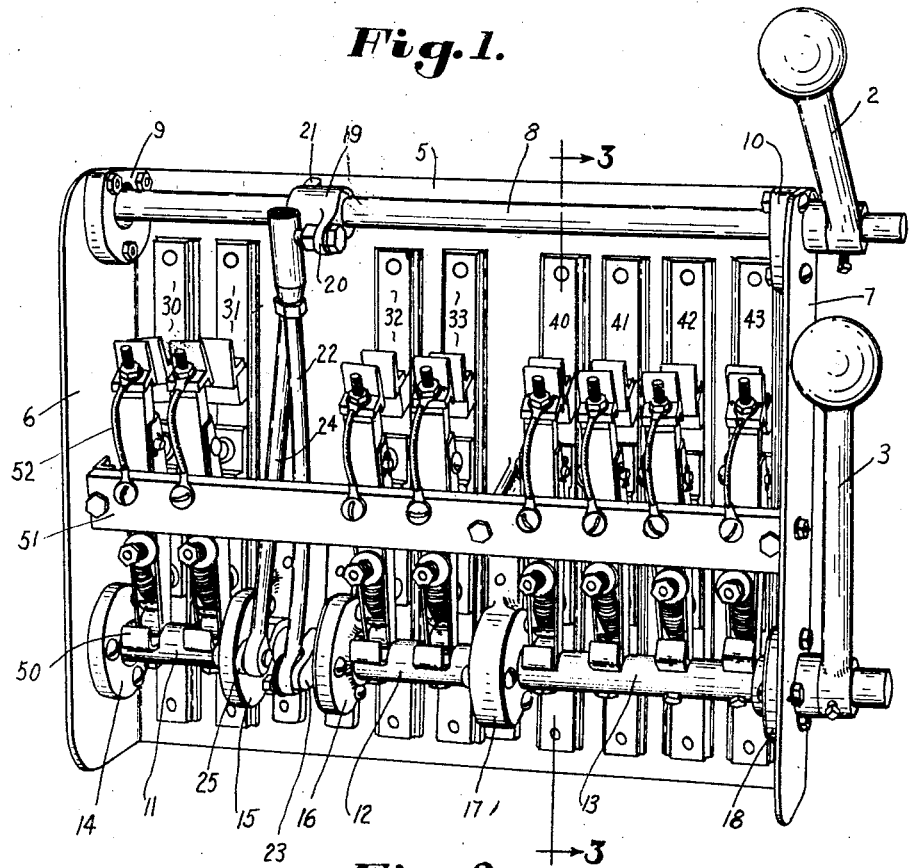
Fig. 2 is a perspective view of a controller embodying my invention.

Fig. 2 is a perspective view of the controller housing with the cover plate (not shown) removed. The controller housing 1 preferably comprises a metal stamping having a back wall 5 and flanged end walls 6 and 7. A rotatable cross shaft 8 is journalled near the top of the end flanges 6 and 7 by bearing members 9 and 10. A series of independently rotatable cross shafts 11, 12 and 13 are journalled within the lower portion of the housing between the bearing members 14—15, 16—17, and 17—18 respectively. The cross shaft 8 is provided with a collar 19 having a forwardly and rearwardly extending lip 20 and 21 disposed thereon. The forward lip 20 is adapted to rotate the shaft 12 through a connecting link 22 and a small crankarm 23 secured to one end of the shaft. In like manner the lip 21 is arranged to rotate the shaft 11 in the opposite direction through the link 24 and a corresponding arm 25. It may thus be seen that when the operating handle 2 is moved in an upward direction the shaft 12 is caused to rotate in the same direction, whereas the shaft 11 is rotated in the opposite direction. The shaft 13 is connected to the operating handle 3 for independent control of the speed contactors as will be herewith more fully described.

The movement of the truck is controlled through a series of individual contactor units arranged within the housing 1. The contactor units numbered 30—33 inclusive are connected to the forward and reversing circuit of the power drive for the truck. The contacts 40—43 inclusive are connected to the power drive through a series of resistances to control the speed and acceleration of the truck. Each of the contactor units is actuated through a series of cams 50 disposed at intervals on the respective shafts 11, 12 and 13. With respect to the shaft 13, the cams 50 are staggered angularly about the axis of the shaft to provide for timing of the respective contactors 40-43.

In operation when the controller handle 2 is in a horizontal position each of the contactors 30-33 opens or breaks the respective circuit to which it is connected as will hereinafter more fully be described. In its upper position the contactors 30 and 31 are closed whereas units 32 and 33 remain open. In the downward position of the handle member 2 the reverse takes place in which contactors 30 and 31 are open whereas 32 and 33 are closed. The operation of the lower speed control handle 3 is such that in a vertical upright position the contactors 40-43 are open whereas in the horizontal position of the handle the contactors are progressively closed at timed intervals. The cross bar 51 which is secured to the housing at several places is composed of insulating material so that it may act as a terminal block for attaching the flexible leads 52 to the respective contactor units and also serve as a stop bar for the respective contactors, as will be hereinafter more fully described. It is thus apparent that with the foregoing arrangement the combined operation of the controller handles 2 and 3 completely cover the various phases of speed and change of direction to which the truck may be assigned.

The individual contactor units are best described with reference to Figs. 3 to 6. Each unit generally comprises a stationary contactor shoe 60 and a movable shoe 61. The stationary shoe is supported on a vertical terminal bar 62 which is secured to the plate 5 by suitable fastening means 63 and insulated therefrom by strips of material 64 and 65.

The present contactor differs materially from other devices which are now in use insofar as the movable contactor member is not limited or confined by any fixed pivotal movement relative to the stationary terminal of the contactor unit. Hence, by eliminating any fixed relationship between the movable contactor element and the stationary element the path of travel, the point of make-and-break, and the timing of the unit may be regulated to overcome any unsatisfactory conditions which have heretofore been experienced by contactors in this field.

To obtain the necessary characteristics of operation as above mentioned a movable contactor shoe 61 is supported upon an insulating arm 70 pivotally connected at the point 72 to the upper end of a floating contactor case 71. The floating member 71 is preferably formed as a three-wall channel having an enlarged opening 73 in the rear wall thereof. A supporting stud 74 is secured by suitable fastening means to the insulating material 65 and projects through the casing in the opening 73. The stud 74 is provided with a slidable sleeve 75, a compression spring 76, and an adjustable nut 77 threadingly engaging the stud to exert a yieldable pressure on the sleeve 75. A portion of the back wall of the casing 71 is flanged inwardly, as at 78, to form a seat for a compression spring 79 and the sleeve 75 is recessed on its underside and provided with a ball bearing 85, to swivelly seat the other end of the spring 79. As the sleeve 75 is slidable within the casing 71, the spring 79 exerts a downward yieldable pressure on the casing 71. A third spring member 80 is disposed between the rear wall of the casing 71 and a recess 81 formed in the arm 70 to thereby exert a yieldable pressure between the contactor shoes 60 and 61. To the lower end of the side walls of the casing 71 there is preferably mounted an anti-friction roller 82, which is maintained in rolling contact with the surface of the cam 50 by the pressure of the spring 79.

In the closed position of the contactor, as illustrated in Fig. 3, the pressure of the spring 76 opposes the force exerted by the spring 80 and in this position the combined effort of the two springs serve to hold the contactor shoes 60 and 61 in closed position. The pressure of the spring 76 may be adjusted relative to the compression of the spring 80 to maintain the shoes 60 and 61 in flat contacting alignment and this adjustment may also serve to compensate for any wear between the surfaces of the contactor shoes 60 and 61.

As the control handle 3 is moved to an upward position as illustrated in Fig. 4, the cam surface 50 exerts an upward thrust on the roller 82, which transmits the direct force to the arm 70 to slide the surfaces of the contactor shoes 60 and 61. It will be noted that during the movement of the contactor to the position illustrated in Fig. 4 the sleeve 75 permits both vertical and horizontal realignment of the contactor case 71 in the plane of the stationary member 60. The pivotal point 72 accordingly assumes a new position in line with the case and the shoe 61. Thus a direct positive thrust is transmitted to the movable shoe 61 to slide the flat surfaces of the contactor shoes 60 and 61 before the circuit is broken. Accordingly any fusing or sticking of the contactor shoes is thereby overcome and eliminated. By eliminating any fixed pivotal connection and supporting the movable contactor elements 70 and 71 for self alignment under spring pressure, a positive sliding movement, rather than a rocking action is obtained between the shoes 60 and 61, the latter of which produces excessive arcing when the circuit is broken under high loads.

Figure 5:
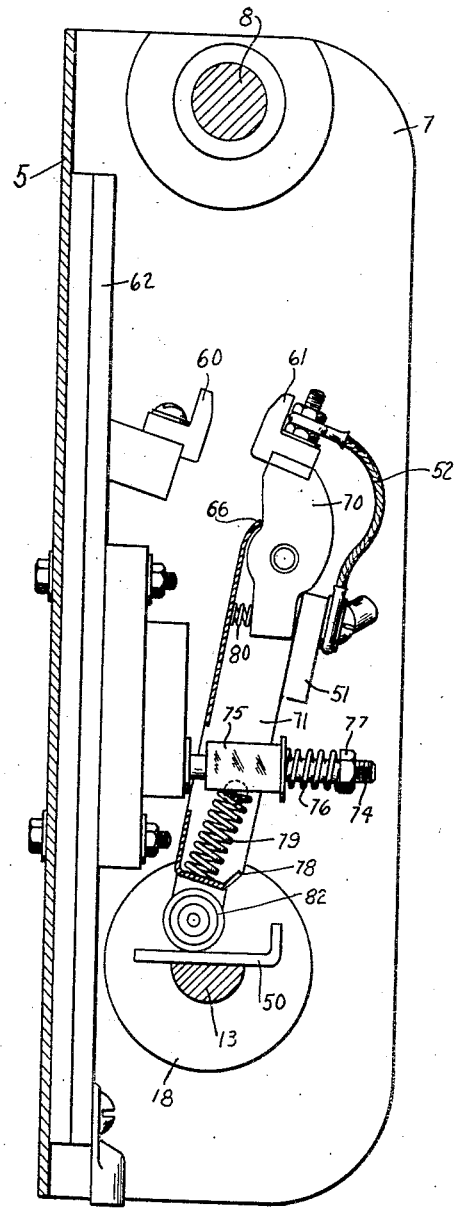
Fig. 5 is a similar view illustrating the contactor unit in open position.
Figure 6:
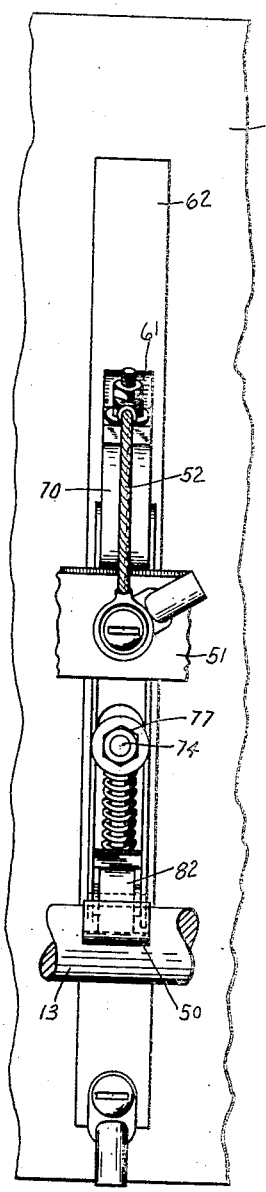
Fig. 6 is a front elevation of an individual contactor unit.

As the cam surface 50 continues to rotate, as illustrated in Fig. 5, the cam roller 82 passes a dead center position after which the superior force of the spring 79 holds the casing 71 in contact with the stop-bar 51. In this position the influence of the spring 80 is counteracted by the superior force of the spring 79 and thus the arm 70 is thrown backward to its open position, by contact with the stop bar 51. This position is maintained until the dead center of the cam surface is again reached after which the reverse action takes place to engage the contactor shoes and slide their respective surfaces into contacting position. As an added precaution against sticking of the contactor shoes 60 and 61, the rear wall of the casing 71 may be provided with a lip 66, to engage the arm 70 and force the same against the bar 51, when the casing is tipped to the position shown in Fig. 5.

It will therefore be seen that by the present invention a direct mechanical force is available to slide the contactor shoes for a considerable interval before the circuit is broken under conditions of high loads and amperage at which time failure is most likely to occur. Further than this it is apparent that by adjusting the relative spring values the contact pressure between the contactor shoes may be definitely controlled and a quick break may be obtained under adverse load conditions.

I claim:

1. In an electrical controller for a motor circuit, a support, a stationary contactor member and a movable contactor member slidably mounted on the support for universal movement in a plane perpendicular to the surface of the stationary contactor member and having a contacting surface adapted for engagement with the stationary member, said movable member comprising an extended arm and a second arm pivotally mounted thereon, said second arm supporting said contacting surface of the movable contactor member and having yieldable means for normally swinging said second arm towards the stationary contactor member, a second yieldable means for positioning the movable contactor member with respect to the support to hold the contacting surface of said movable contactor member in engagement with the stationary member, and a controller member carried by the support for opening and closing the contact members including a camming mechanism for engaging the movable contactor member to positively shift the same longitudinally and thereby slide the respective surfaces of the contacting members before the contacting surfaces are separated.

2. In an electrical controller for a motor circuit, a support, a stationary contactor member and a movable contactor member having a contacting surface for engaging the stationary member, means for slidably mounting the movable contactor member on the support for universal movement in a plane perpendicular to the surface of the stationary contact member, said means including a pin projecting from said support and loosely penetrating an aperture provided in said movable contact member, a block slidably on said pin, abutment means to limit movement of the block on said pin, a compression spring imposed between said block and an opposed portion of said movable contact member, and actuating means engaging said movable contact member for positively sliding it relatively to said stationary contact member and against the tension of said spring, said actuating means including a cam surface in engagement with an end portion of said movable contact member and tiltable about an axis transverse to said pin and substantially parallel to the plane of said support whereby to rock said movable contact member towards and away from said stationary contact member as said cam surface is tilted in opposite directions about its axis.

3. In an electrical controller for a motor circuit, a support, a stationary contact member and a movable contactor member having a contacting surface for engaging the stationary member, means for slidably mounting the movable contactor member on the support for universal movement in a plane perpendicular to the surface of the stationary contact member, said means including a pin projecting from said support and loosely penetrating an aperture provided in said movable contact member, a block slidably on said pin, a compression spring interposed between the block and the free end of the pin, a second compression spring interposed between said block and an opposed portion of said movable contact member on an axis transverse to the axis of said first spring, and actuating means engaging said movable contact member for positively sliding it relatively to said stationary contact member and against the tension of said second spring, said actuating means including a cam surface in engagement with an end portion of said movable contact member and tiltable about an axis transverse to said pin and substantially parallel to the plane of said support whereby to rock said movable contact member towards and away from said stationary contact member as said cam surface is tilted in opposite direction about its axis.

4. In an electrical controller for a motor circuit, a support, a stationary contactor member and a movable contactor member slidably mounted on the support for universal movement in a plane perpendicular to the surface of the stationary contactor member and having a contacting surface adapted for engagement with the stationary member, said movable contactor member comprising an extending arm and a second arm pivotally mounted thereon, said second arm supporting the contacting surface of said movable contactor member and having yieldable means for normally swinging said contacting surface towards the stationary contactor member, a second yielding means for positioning the movable contactor member with respect to the support to hold the contacting surface of said movable contacting member in engagement with the stationary contactor member, and a controller member carried by the support for opening and closing the contact members and including a camming mechanism for engaging the movable contactor member to positively shift the same longitudinally and slide the respective surfaces of the contact members before they are separated and means carried by said movable contact member to positively engage said second arm at a point between its pivotal mounting and the contacting surface carried thereby during the opening movement of said movable contactor member.

WAVEARD D. PARKER.